United States Patent Office 2,850,530
Patented Sept. 2, 1958

2,850,530
SUBSTITUTED UREA COMPOUNDS AND PROCESSES FOR PREPARING THE SAME

Robert C. O'Neill, New York, N. Y., and Arthur J. Basso, Rahway, N. J., assignors to Merck & Co., Inc., Rahway, N. J., a corporation of New Jersey No Drawing. Application August 6, 1956
Serial No. 602,463

4 Claims. (Cl. 260—553)

This invention relates to novel processes for preparing substituted urea compounds.

It has been found that certain of these substituted urea compounds possess marked and effective action in the control and treatment of the disease coccidiosis which infects poultry.

The substituted urea compounds with which this invention is concerned may be represented by the following structural formula:

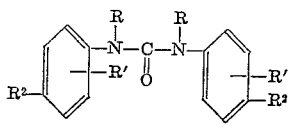

wherein R is methyl or allyl, R' is hydrogen or a lower alkyl group and R² is an electron withdrawing group.

The electron withdrawing groups which may be substituted in the 4 and 4'-positions in the above formula include nitro, cyano, carboxyl, carboalkoxy, acetyl, trimethyl ammonium, sulfonic acid, sulfonamide and carbamido groups. Such groups are alternatively referred to as meta directing (see Fieser and Fieser, "Organic Chemistry," 2nd edition, 1950, p. 595). Specific carbanilide compounds which may be N-alkylated include 4,4'-dinitrocarbanilide; 2-methyl 4,4'-dinitrocarbanilide and 4,4'-dicyanocarbanilide. The electron withdrawing groups need not be the same and compounds such as 4-nitro-4'-cyanocarbanilide, and 4-nitro-4'-acetocarbanilide may be employed. The 4,4'-dinitro group is preferred but other carbanilides having different electron withdrawing groups in the 4 and 4'-positions may be used.

These substituted urea compounds may be produced by reacting a compound of the formula

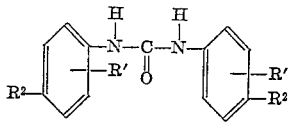

wherein R' is hydrogen or alkyl and R² is an electron withdrawing group, is reacted with methyl halide, dimethyl sulfate, or allyl halide in the presence of a strong base to form a compound of the formula

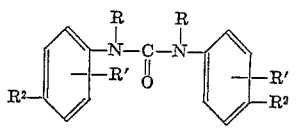

wherein R' and R² are as above and R is methyl or allyl.

In accordance with this novel procedure 4,4'-dinitrocarbanilide is suspended in acetone and potassium hydroxide is added at room temperature. The mixture is then reacted with a methylating agent such as methyl iodide or dimethyl sulfate to form N,N'-dimethyl-4,4'-dinitrocarbanilide.

In like manner N,N'-diallyl-4,4'-dinitrocarbanilide can be prepared by reacting 4,4'-dinitrocarbanilide with potassium hydroxide and allyl bromide or allyl iodide.

The following examples are intended to be illustrative only and may be varied or modified without departing from the spirit and scope of this invention:

EXAMPLE 1

Preparation of N,N'-dimethyl-4,4'-dinitrocarbanilide

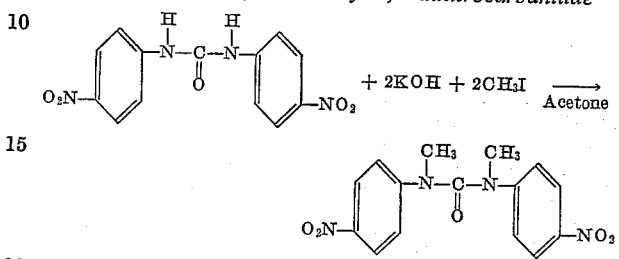

96.6 grams (0.32 mol) of 4,4'-dinitrocarbanilide were suspended in 900 ml. of acetone. Then 112 g. (2 mol) of potassium hydroxide (85% purity) was rapidly added to the stirred slurry at room temperature. The slurry became reddish-brown and, within a few minutes, dark green. Methyl iodide (10.5 ml., 1.28 mol) was added about five minutes after the potassium hydroxide.

The slurry was stirred at vigorous reflux for one hour, fifteen minutes. The supernatant became progressively clearer and deeper in color during the reflux period until near the end an amber liquor and heavy steel-gray insolubles (mostly excess potassium hydroxide) remained. The hot reaction slurry was suction filtered, and the cake washed with three 400 ml. portions of acetone. The combined acetone filtrate was allowed to evaporate for approximately 16 hours at room temperature. The mass of crystals of N,N'-dimethyl-4,4'-dinitrocarbanilide that remained was triturated well with water, 6 N hydrochloric acid (to remove p-nitraniline or its N-methylated derivatives), water, ethanol, and finally ether. The volumes of washes are not critical due to the sparing solubility of the product in water, ethanol and ether at room temperature. The crystals of N,N'-dimethyl-4,4'-dinitrocarbanilide thus obtained melted at 156.5–157.5° C. to form a clear yellow liquid. N,N'-dimethyl-4,4'-dinitrocarbanilide recrystallizes well from several solvents. For example, 12.1 grams of N,N'-dimethyl-4,4'-dinitrocarbanilide was dissolved in 175 ml. of boiling ethyl acetate, and the mixture allowed to stand at room temperature. The N,N'-dimethyl-4,4'-dinitrocarbanilide thus obtained had a melting point of 156.5–157.5° C.

The infrared spectrum of N,N'-dimethyl-4,4'-dinitrocarbanilide was characterized by a "normal urea carbonyl" band at 6.02 μ. The C=O of dinitrocarbanilide appears at 5.75 μ. The ultra violet absorption of N,N'-dimethyl-4,4'-dinitrocarbanilide in ethanol: Maximum 3400; E% 1250.

EXAMPLE 2

Preparation of N,N'-dimethyl-4,4'-dinitrocarbanilide

To a stirred slurry of 4,4'-dinitrocarbanilide (30.2 g., 0.1 mole) and powdered potassium hydroxide (13.4 g., 0.22 mole) at room temperature were added dimethyl sulfate (37.8 g., 0.3 mole) in thirty minutes. The stirred slurry was heated at reflux for two hours, then filtered hot. The crystals obtained on evaporation of the acetone filtrate were washed on a funnel with water, ethanol, and finally ether. The dry N,N'-dimethyl-4,4'-dinitrocarbanilide thus obtained weighed 18.35 g.; M. P. 149–151°. This material showed no depression in melting point on admixture with a sample prepared as described in Example 1.

EXAMPLE 3

*Preparation of N,N'-diallyl-4,4'-dinitrocarbanilide*

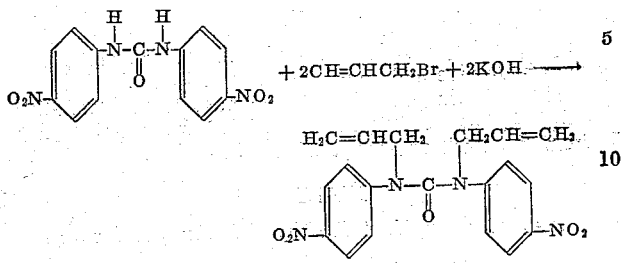

A mixture of 400 ml. of acetone, 15.8 g. (0.24 mol) of powdered potassium hydroxide (85%) and 18.12 g. (0.02 mol) of dry, powdered 4,4'-dinitrocarbanilide was prepared. To the stirred brightly colored slurry was added 24.2 g. (0.2 mol) of allyl bromine in one portion. The stirred reaction mixture was refluxed for one and one-half hours, and then filtered with vacuum. From the insoluble cake was obtained 2.6 g. (14.4%) of recovered dinitrocarbanilide. On removal of acetone from the filtrate, there remained a crystalline deposit contaminated with a yellow oil. Following trituration of the magma with ether, filtration, and methanol recrystallization of the crystalline cake, there was obtained pale yellow crystals of N,N'-diallyl-4,4'-dinitrocarbanilide having a melting point of 109–109.5° C.

Any departure from the above description which conforms to the present invention is intended to be included within the scope of the claims.

What is claimed is:

1. The process which comprises reacting a compound of the formula

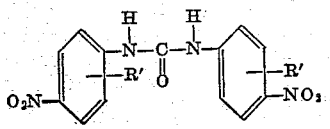

wherein R' is selected from the group consisting of hydrogen and alkyl groups with a compound selected from the group consisting of methyl halide, dimethyl sulfate, and allyl halide in the presence of a strong base to form a compound of the formula

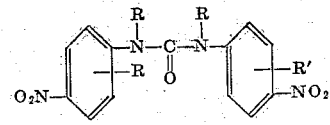

wherein R' is as above and R is selected from the group consisting of methyl and allyl.

2. The process which comprises reacting 4,4'-dinitrocarbanilide with methyl iodide in the presence of potassium hydroxide to form N,N'-dimethyl-4,4'-dinitrocarbanilide.

3. The process which comprises reacting 4,4'-dinitrocarbanilide with dimethyl sulfate in the presence of potassium hydroxide to form N,N'-dimethyl-4,4'-dinitrocarbanilide.

4. The process which comprises reacting 4,4'-dinitrocarbanilide with allyl bromide in the presence of potassium hydroxide to form N,N'-diallyl-4,4'-dinitrocarbanilide.

References Cited in the file of this patent

UNITED STATES PATENTS 2,336,464   Buck et al. _____ Dec. 14, 1943

OTHER REFERENCES

Beilstein: "Handbuch der organischen Chemie," vol. 12; system No. (1639), 1st. Supplement, page 253, 4th edition.